Feb. 4, 1930.  F. LECHNER  1,746,120
AUTOMOBILE SIGNAL LIGHT
Filed Oct. 21, 1926  2 Sheets-Sheet 1
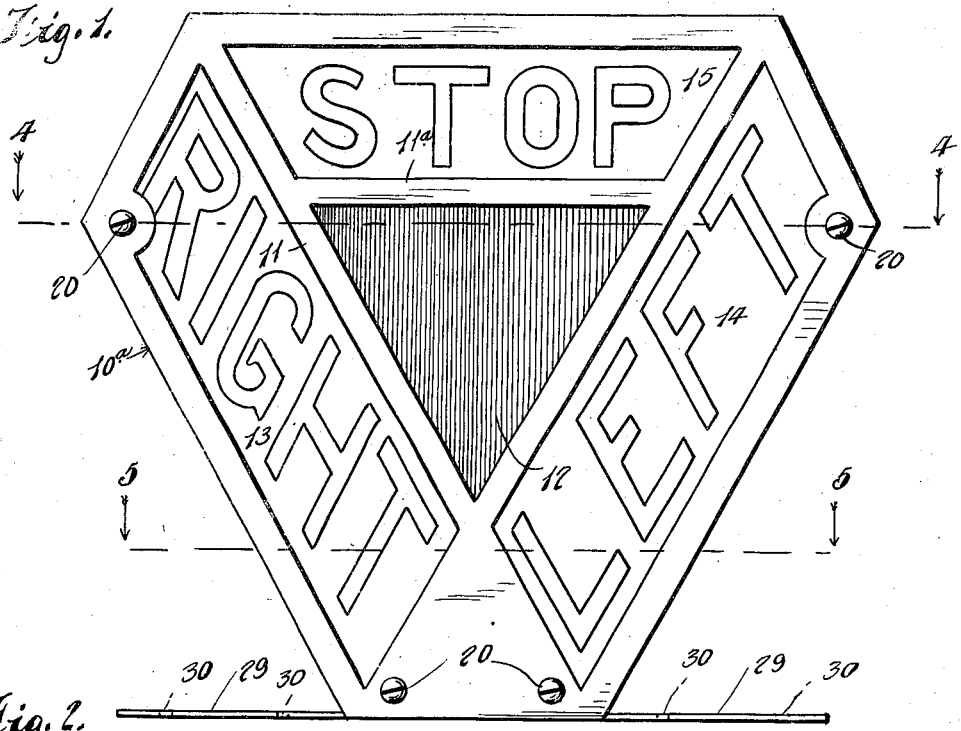
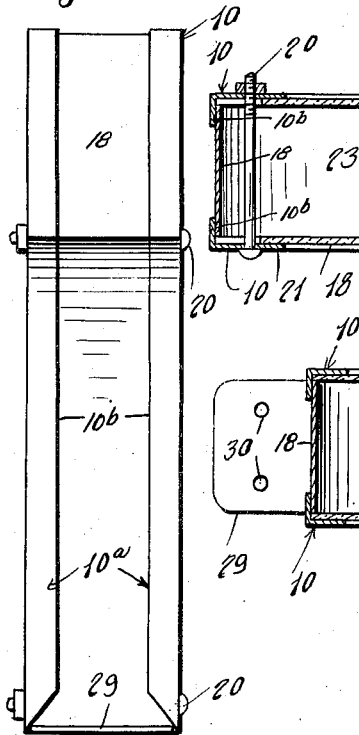
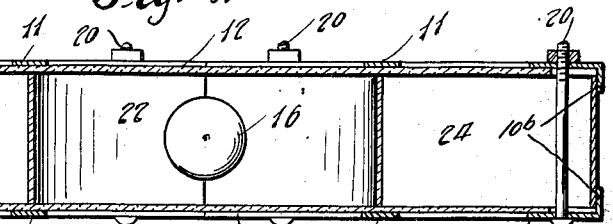
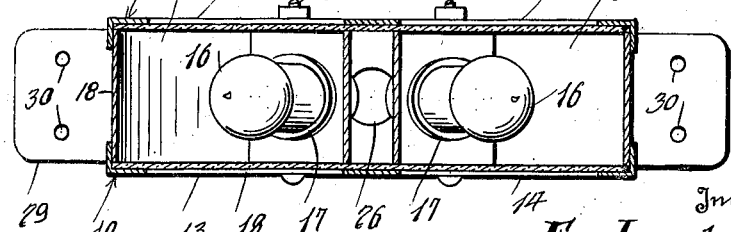
Inventor
F. Lechner
By
Attorney Feb. 4, 1930.  F. LECHNER  1,746,120
AUTOMOBILE SIGNAL LIGHT
Filed Oct. 21, 1926  2 Sheets-Sheet 2

Inventor
F. Lechner.

Patented Feb. 4, 1930

1,746,120

UNITED STATES PATENT OFFICE

FULTON LECHNER, OF ORWIGSBURG, PENNSYLVANIA

AUTOMOBILE SIGNAL LIGHT

Application filed October 21, 1926. Serial No. 143,193.

This invention relates to an automobile signal light.

It is aimed to provide a novel, exceedingly compact, durable, efficient and inexpensive signal adapted to apprise both traffic in rear thereof and traffic officers, as to stops and turns, and as well serve as a parking light and if desired, as a sign.

The more specific objects and advantages, will partly be pointed out and otherwise appear from a consideration of the description following taken in connection with accompanying drawings, wherein an operative embodiment is shown.

In said drawings:—

Figure 1 is an elevation of the signal;

Figure 2 is an edge view thereof;

Figure 4 is a cross sectional view taken on the line 4—4 of Figure 1,

Figure 5 is a cross sectional view taken on the line 5—5 of Figure 1, and

Figure 3:
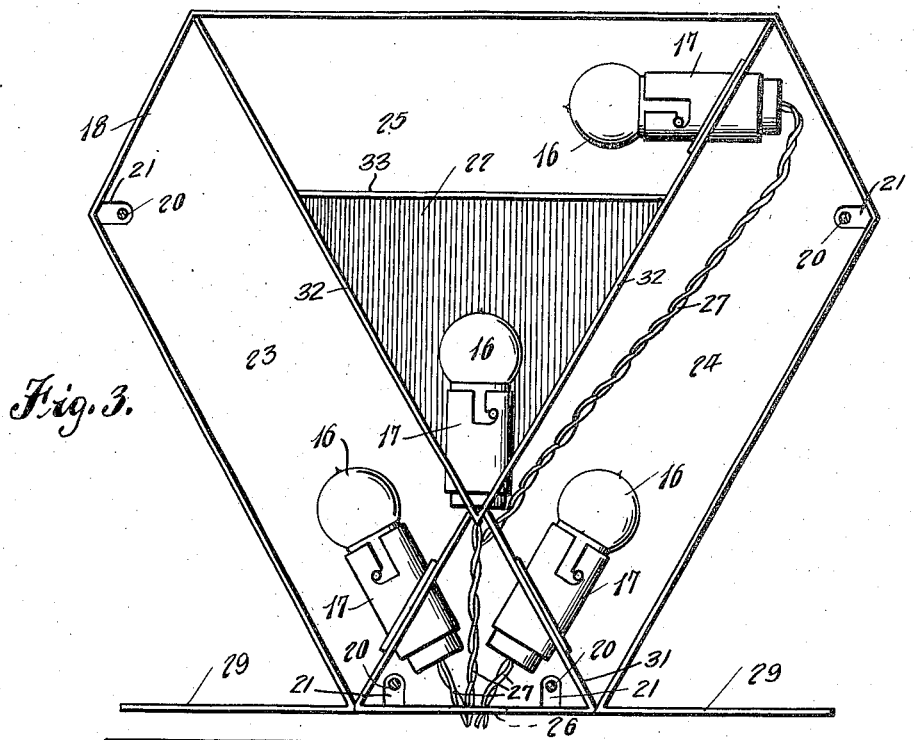
Figure 3 is an elevation with one side removed to disclose interior details.
Figure 6:
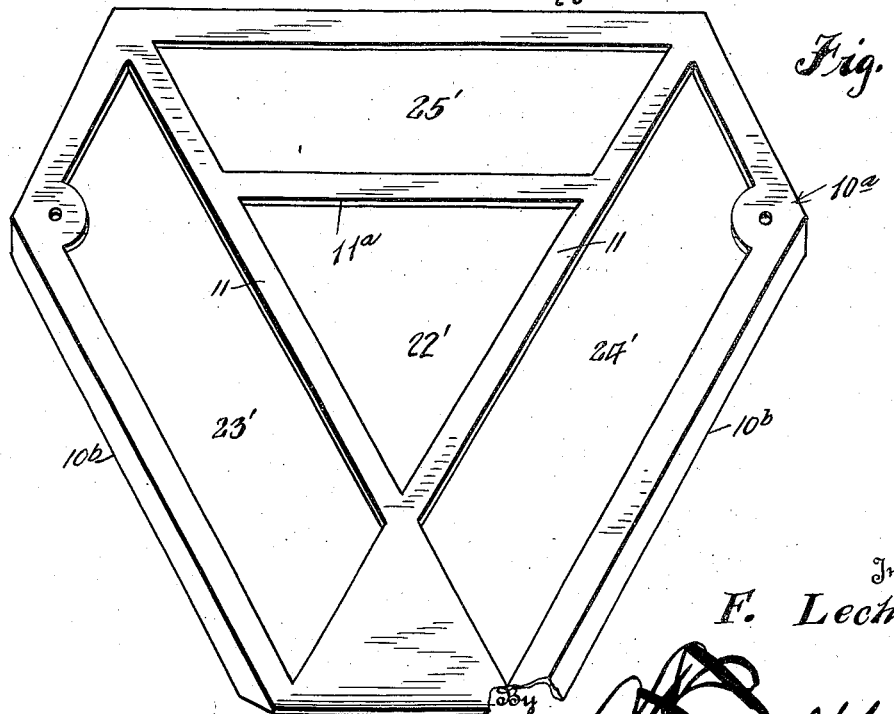
Figure 6 is a perspective view of one of the outer frames.

Referring specifically to the drawings, the signal is generally of triangular form and has the parts detachably connected together so that they may be removed for inspection, replacement or repair, and so arranged as to be readily attachable to an automobile, preferably the rear left fender.

Specifically the signal comprises a generally triangular casing 10 including a supporting frame 18 formed of a single strip of material and having its end portions bent outwardly on an angle to the adjacent sides of the frame 18 and forming supporting members 29 provided with openings 30 through which securing members may be inserted to hold the casing in position on the fender or other part of an automobile (not shown). 31 indicates a partition member that is also formed of a similar strip of material bent into triangular shape and secured between and spacing said supporting members 29. 32 designates a V-shaped partition secured in the frame 18 and supported on the ends of the strip forming the partition member 31. The partition member 31 and angular partition 29 forms with the adjacent sides of frame 18 signal compartments 23 and 24. 33 designates a partition supported on and secured to the legs of the V-shaped partition 32 and forming therewith a signal compartment 22 and with the top of the frame 18 signal compartment 25. The compartments 22, 23, 24 and 25 are arranged to be illuminated by means of electric lamps 16 secured in conventional sockets 17 supported on said partitions 31 and 32.

The casing 10 is completed by identical front and rear plates 10$^a$ having cut-out portions forming signalling openings 22', 23', 24' and 25' corresponding to and when in position on the frame 18 alining with the compartments 22, 23, 24 and 25, and in which are arranged signal panels 12, 13, 14 and 15, respectively. Signal panel 12 is preferably colored red and when illuminated by the lamp 16 in compartment 22 serves as the rear driving light. Panels 13, 14 and 15 are respectively provided with the legends "Right," "Left" and "Stop" and may be of any desired color or clear as may be preferred.

Plates 10$^a$ are arranged to cover the frame 18 and partition member 31 has portions 11 and 11$^a$ that cover partitions 32 and 33, respectively, and border flanges 10$^b$ that overlap the edges of the frame 18.

Cover plates 10$^a$ and frame 18 is held in assembled relation by means of bolts 20 secured through said plates and through ears 21 on the frame 18 and partition member 31.

26 indicates an opening in lower portion of partition member 31 through which the conductor wires 27 are extended to be connected to the several sockets 17.

I claim as my invention:—

1. In a signal, a casing including a frame formed of a single piece of material bent intermediate of its ends to provide side and top walls, the ends of said material bent outwardly at an angle to the sides of the frame to provide supports, a partition member secured between and spacing said supports, other partition members secured in the frame and providing signal compartments, means to illuminate said compartments, plates covering the two faces of the frame and secured thereto and having openings therein alining with said compartments, transparent panels arranged in said openings, and flanges on the edges of said plates engaging the outer sides of said frame.

2. In a signal, a casing including a frame formed of a single piece of material bent intermediate of its ends to provide side and top walls, the ends of said material bent outwardly at an angle to the sides of the frame to provide supports, a partition member secured between and spacing said supports, other partition members secured in the frame and providing signal compartments arranged at an angle to each other and a central signal compartment, means to illuminate said compartments, plates covering the two faces of said frame and secured thereto, flanges on said plates engaging the sides and top of the frame, said plates having openings alining with said compartments, and transparent panels arranged in said openings.

In testimony whereof I affix my signature.

FULTON LECHNER.